United States Patent
Chenoweth

(10) Patent No.: US 9,747,816 B2
(45) Date of Patent: Aug. 29, 2017

(54) PREGNANCY EDUCATION DOLLS

(71) Applicant: Joni L. Chenoweth, East Barre, VT (US)

(72) Inventor: Joni L. Chenoweth, East Barre, VT (US)

(*) Notice: Subject to any disclaimer, the term of this patent is extended or adjusted under 35 U.S.C. 154(b) by 202 days.

(21) Appl. No.: 14/805,513

(22) Filed: Jul. 22, 2015

(65) Prior Publication Data

US 2017/0025043 A1    Jan. 26, 2017

(51) Int. Cl.
   *G09B 23/28*    (2006.01)
   *G09B 23/32*    (2006.01)
   *G09B 23/34*    (2006.01)

(52) U.S. Cl.
   CPC .......... *G09B 23/281* (2013.01); *G09B 23/32* (2013.01); *G09B 23/34* (2013.01)

(58) Field of Classification Search
   USPC ........ 434/262, 267, 273; 446/268, 295, 296, 446/301, 320
   See application file for complete search history.

(56) References Cited

U.S. PATENT DOCUMENTS

| | | | |
|---|---|---|---|
| 1,543,351 A * | 6/1925 | Webb | A63H 3/00 446/369 |
| 2,551,560 A | 5/1951 | Graves | |
| 2,611,997 A * | 9/1952 | Solloway | A63H 13/10 124/16 |
| 3,826,019 A | 7/1974 | Knapp et al. | |
| 4,197,670 A | 4/1980 | Cox | |
| 4,237,649 A * | 12/1980 | Goldfarb | G09B 23/281 434/262 |
| 4,411,629 A * | 10/1983 | Voights | G09B 23/281 434/266 |
| 4,836,821 A * | 6/1989 | Raymond | A63H 3/008 446/310 |
| 4,883,442 A | 11/1989 | Kaplan | |
| 5,083,962 A | 1/1992 | Pracas | |
| 5,104,328 A * | 4/1992 | Lounsbury | G09B 23/34 434/267 |
| 5,207,728 A * | 5/1993 | Fogarty | A63H 3/008 2/69 |

(Continued)

FOREIGN PATENT DOCUMENTS

WO        WO02/01536        1/2002

*Primary Examiner* — Kurt Fernstrom
(74) *Attorney, Agent, or Firm* — Livingston Loeffler, P.A.; Edward M. Livingston, Esq.; Bryan L. Loeffler, Esq.

(57) ABSTRACT

A set of pregnancy education dolls (1) with an adult female doll (4) resembling a fully developed adult female and a child female doll (5) resembling a young teen or preteen female. Each doll has a womb (3) that is accessible through openings (10) in the bellies (11) of each doll. At least one baby doll (2) is preferably attached the set of pregnancy education dolls via a cord (12) that resembles an umbilical cord. The at least one baby doll may be placed inside the womb of the adult female doll and then pushed through a pelvic outlet (13A), thereby simulating childbirth. The at least one baby doll may also be placed inside the womb of the child female doll, however, the child female doll 5 has pelvic outlet (13B) that is smaller than the adult female doll's pelvic outlet, thereby demonstrating the danger of pregnancy in young females and the cause of obstetric fistulas.

13 Claims, 4 Drawing Sheets

(56) References Cited

U.S. PATENT DOCUMENTS

| | | | |
|---|---|---|---|
| 5,308,277 A | | 5/1994 | Nielsen |
| D347,655 S | | 6/1994 | Munro |
| D470,546 S | * | 2/2003 | Torrejon-Romani .......... D19/62 |
| 7,114,954 B2 | | 10/2006 | Eggert et al. |
| 7,241,145 B2 | | 7/2007 | Riener et al. |
| 7,465,168 B2 | | 12/2008 | Allen et al. |
| 8,128,413 B2 | * | 3/2012 | Lynch ...................... A41D 1/20 |
| | | | 434/273 |
| 8,939,770 B2 | | 1/2015 | Gonzalez |
| 9,004,922 B2 | * | 4/2015 | Eggert ................ G06F 19/3437 |
| | | | 434/273 |

* cited by examiner

PREGNANCY EDUCATION DOLLS

FIELD OF THE INVENTION

This invention relates to educational devices for use in teaching young girls and others about the causes of obstructed labor, and how these may lead to obstetric fistula.

BACKGROUND OF THE INVENTION

As many as one half million women die each year from complications of labor. One of the common causes of these deaths is from obstructed labor. Of the women who experience obstructed labor, and who don't die, many develop a condition known as obstetric fistula. An obstetric fistula is an opening or hole that forms between the bladder and/or rectum and the vagina, after a prolonged labor, causing the woman to become incontinent. It is estimated that there are 2-4 million existing cases of obstetric fistula currently, and there are 150,000 new cases of this condition each year. This is a problem in developing countries all over the world, including South and Central America, Africa, the Middle East, and Southeast Asia. Obstetric fistula usually occur in two groups of women. The most common are young girls who are married when they reach puberty or before, are generally small in stature, malnourished and have little or no access to health care. In this group obstetric fistula occurs in their first pregnancy. The second most common population is in older women who have had many children, with each successive infant becoming larger. Or, she may have entangled twins or congenital malformations, such that the infant(s) are too large to be delivered without surgery. These women may have underlying conditions such as diabetes, which can cause infants to grow unusually large, or "macrosomic".

In both of these cases, there is a disproportion between the size of the infants head, and the opening of the bony pelvis, making it impossible for the infant to be delivered. Once the uterus has begun contracting, it will continue to contract until its contents are expelled. In some cases a prolonged obstructed labor may last up to a week, during which time the woman will suffer excruciating pain and her infant will die. The labor contractions push the infants head against the bladder or rectum and the bony pelvis, depriving the tissue of blood and causing the tissue to die, this will form an opening between the vagina, bladder and/or rectum. After the woman has delivered her dead infant, she will find that urine or stool or both are pouring out of her uncontrollably through the passageway in her vagina.

The foul odor leads to severe stigmatization for various reasons. Females who develop obstetric fistula often are rejected by their husbands. Their incontinence and pain render them unable to perform household chores and further child rearing, thus devaluing their worth. They are often forced to leave their villages or live in isolated huts. If they do not die of infection or starvation, they may lie in fetal position for years, vainly attempting to control their incontinence. As a result of this, they may develop leg atrophy and muscle contractions leaving them unable to walk. The intense loneliness and shame can lead to clinical depression and suicide.

Many societies do not believe obstructed labor, which leads to obstetric fistula, is a medical condition, but rather a divine punishment or curse for disloyal, disrespectful or unfaithful behavior. There are multiple dangerous and sometimes lethal traditional medicine cures for this condition. These include sitting on the woman, attempting to cut (often with unsterile knives or glass) the "webs" inside of her vagina which spirits have formed, making her confess her sins, or drink dangerous potions—all to no avail. Because this condition is not understood to be a medical condition, often medical treatment is not sought, even if it is available. All of these injuries could be prevented with basic access to maternal health care and cesarean sections. The United States had many patients with obstetric fistula until the early 1900's when cesarean section surgeries began being performed. In fact, what once was the main fistula hospital in New York City is now the Waldorf Historia.

High levels of poverty and low levels of education among women and their communities in developing countries, lead to serious maternal health issues, including lifelong injuries and death. A lack of basic knowledge of anatomy and some of the causes of obstructed labor, as well as limited access to health care, are conditions that lead to obstetric fistulas, with the resulting devastating consequences.

Therefore a need exists for pregnancy education dolls to teach the causes of obstructed labor and the causes of obstetric fistulas resulting from obstructed labor. These three dolls show both normal anatomy and examples of disproportion, (in both very young girls and in older women), between the size of the infant's head and the opening of the bony pelvis, thus making it impossible to deliver.

The relevant prior art includes the following references:

| Patent No. | Inventor | Issue/Publication Date |
|---|---|---|
| 2,551,560 | Graves | May 1, 1951 |
| 3,826,019 | Knapp et al. | Jul. 30, 1974 |
| 4,197,670 | Cox | Mar. 15, 1980 |
| 4,883,442 | Kaplan | Nov. 28, 1989 |
| 5,083,962 | Pracas | Jan. 28, 1992 |
| D347,655 | Munro | Jun. 7, 1994 |
| 5,308,277 | Nielsen | May 3, 1994 |
| 7,114,954 | Eggert et al. | Oct. 3, 2006 |
| 7,241,145 | Riener et al. | Jul. 10, 2007 |
| 7,465,168 | Allen et al. | Dec. 16, 2008 |
| 8,939,770 | Gonzalez | Jan. 27, 2015 |
| WO02/01536 | Markiewicz | Jan. 3, 2002 |

SUMMARY OF THE INVENTION

The main object of the present invention is to provide pregnancy education dolls used to teach the causes of obstructed labor that can result in obstetric fistula during childbirth. These dolls are used to teach both normal anatomy, and examples of disproportion between the size of the infant's head and the opening of the bony pelvis, making it impossible to deliver. Dolls show anatomy of both very young girls and older females.

An additional object of the present invention is to provide pregnancy education dolls that teach the danger of pregnancy in young girls.

An additional object of the present invention is to provide pregnancy education dolls that remove the stigmatization of women who suffer the occurrence of obstetric fistulas from prolonged obstructed labor.

An additional object of the present invention is to provide pregnancy education dolls that provide psychological and therapeutic effects for young girls and women who have lost their infants, and who are suffering from grief and depression.

The present invention fulfills the above and other objects by providing a set of anatomically correct dolls. The first doll is a fully developed female. The second doll is a teen or young girl whose pelvis is too small to deliver. The third doll is an older woman whose pelvis is a normal size, but whose infant(s) are too large to be delivered. The dolls are used as an educational aid for teaching about obstructed labor as a cause of obstetric fistula, and relate to giving birth. Each doll has a womb that is accessible through an opening in the belly. A baby may be placed inside the womb of the adult doll and then pushed through a pelvic outlet, thereby simulating birth. The baby may also be placed inside the womb of the child doll, however, the child doll has a smaller pelvic outlet through which the baby will not fit. In the older female doll, the baby may be placed inside the womb, however, despite having a normal sized pelvic outlet, the infant(s) will not fit, as the infant(s) are too large. The purpose of the dolls is to teach individuals about female anatomy and how obstructed labor can lead to obstetric fistula.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
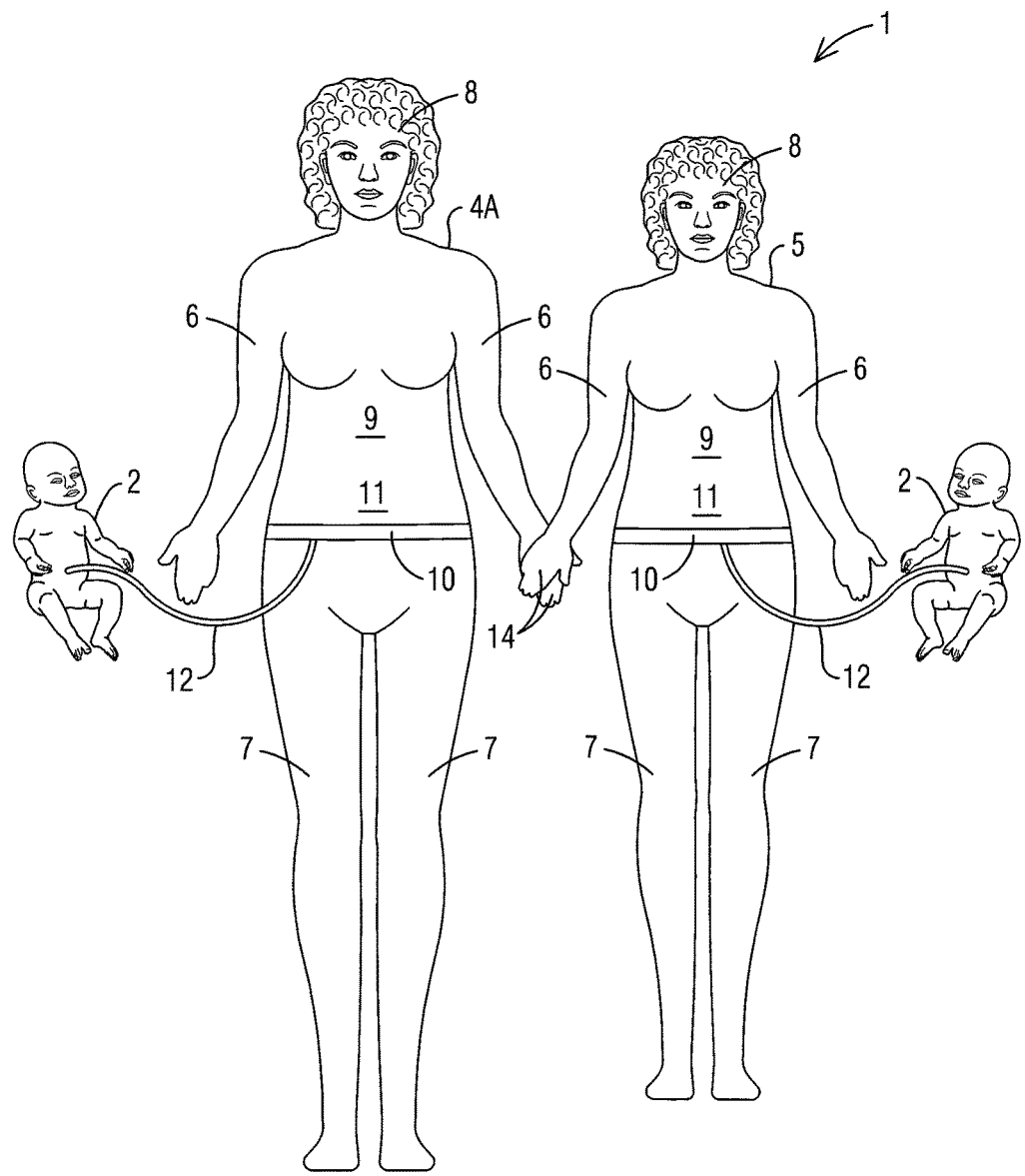
FIG. 1 is a front view of a set of pregnancy education dolls of the present invention with the babies of each doll located outside of the wombs.
Figure 2A:
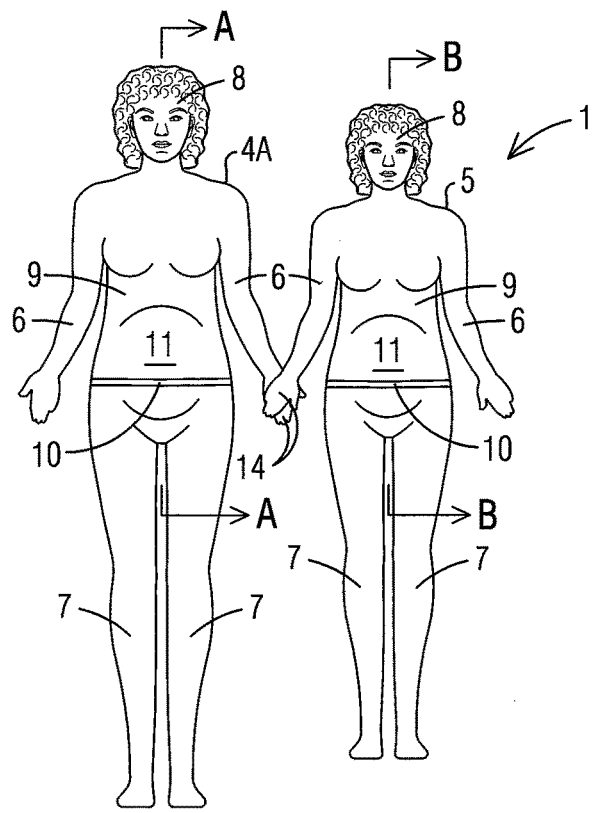
FIG. 2A a front view of a set of pregnancy education dolls of the present invention with the babies of each doll placed inside the wombs.
Figures 3A, 3B:
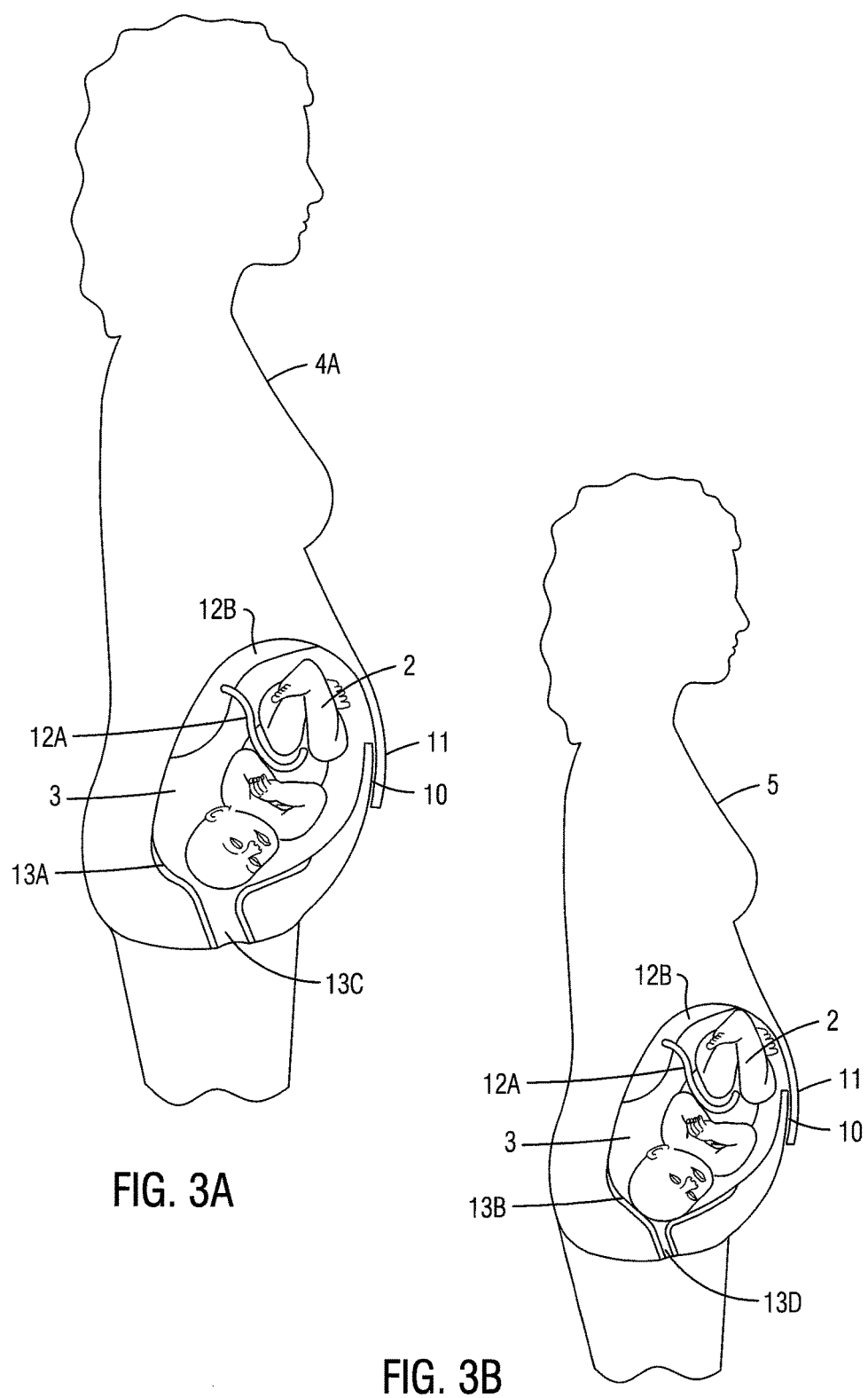
FIG. 3A is a cross-sectional view along line A-A of FIG. 2A of the adult female doll.
FIG. 3B is a cross-sectional view along line B-B of FIG. 2A of the child female doll.
Figure 4A:
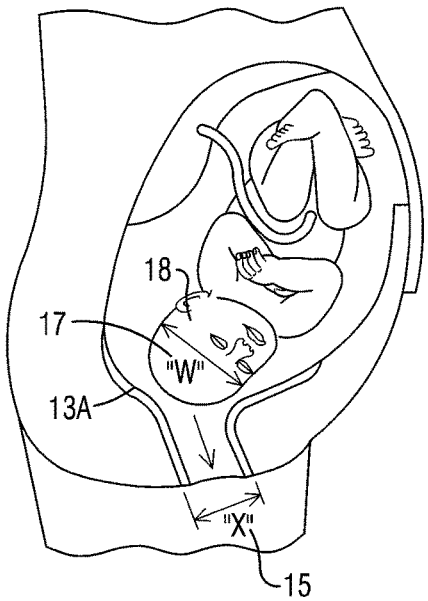
FIG. 4A is a cutaway view of an adult female doll's pelvic outlet.
Figure 4B:
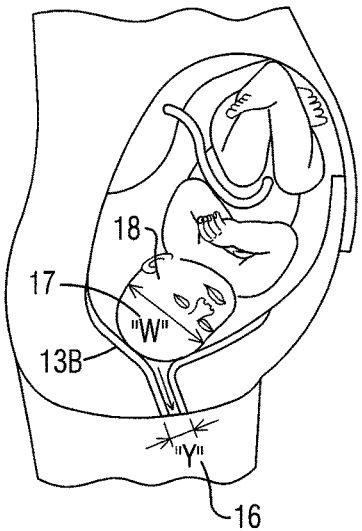
FIG. 4B is a cutaway view of an child female doll's pelvic outlet.

For purposes of describing the preferred embodiment, the terminology used in reference to the numbered components in the drawings is as follows:
1. pregnancy education dolls, generally
2. baby
3. womb
4A. adult female doll
4B. mature adult female doll
5. child female doll
6. arm
7. leg
8. head
9. torso
10. opening in the belly
11. belly
12A. cord
12B. placenta
13A. adult female doll pelvic outlet
13B. child female doll pelvic outlet
13C. adult female doll birth canal
13D. child female doll birth canal
14. hand
15. diameter "X"
16. diameter "Y"
17. diameter "W"
18. baby doll's head
19. visual age characteristics With reference to FIGS. 1 and 2A, a front view of a set of pregnancy education dolls 1 of the present invention with the baby dolls 2 of each doll located outside of the wombs 3 and a front view of a set of pregnancy education dolls 1 of the present invention with the baby dolls 2 of each doll placed inside the wombs 3, respectively, are illustrated. The set of pregnancy education dolls 1 comprise an adult female doll 4A and a child female doll 5 each having arms 6, legs 7, heads 8 and torsos 9. The adult female doll 4A resembles a fully developed adult female and child female doll 5 resembles a young teen or preteen female. A height of the child female doll 5 is preferably less than a height of the adult female doll 4A. Each doll 4A, 5 has a womb 3 or compartment located in their torsos 9 (as illustrated in FIGS. 3A and 3B) that are accessible through openings 10 in the bellies 11 of each doll. At least one baby doll 2 used in conjunction with the set of pregnancy education dolls 1 and is preferably attached via a cord 12A that resembles an umbilical cord and placenta 12B. The at least one baby doll 2 may be placed inside the womb 3 of the adult female doll 4A and then pushed through a pelvic outlet 13A and then the birth canal 13C (as illustrated in FIGS. 3A and 3B), thereby simulating childbirth. The at least one baby doll 2 may also be placed inside the womb 3 of the child female doll 5, however, the child female doll 5 has pelvic outlet 13B that is smaller than the adult female doll's pelvic outlet 13A (as illustrated in FIGS. 4A and 4B). Therefore, the child will not fit through the pelvic outlet 13B and the birth canal 13D. The dolls may also comprise visual age characteristics 19, such as facial features, body size, breast size, clothing style and so forth, to illustrate the difference in ages of the dolls.

The adult female doll 4A and the child female doll 5 may also be connected to each other to highlight the comparative nature of the set of pregnancy education dolls 1 of the present invention. As illustrated here, the adult female doll 4A and the child female doll 5 are holding hands 14.

Figure 2B:
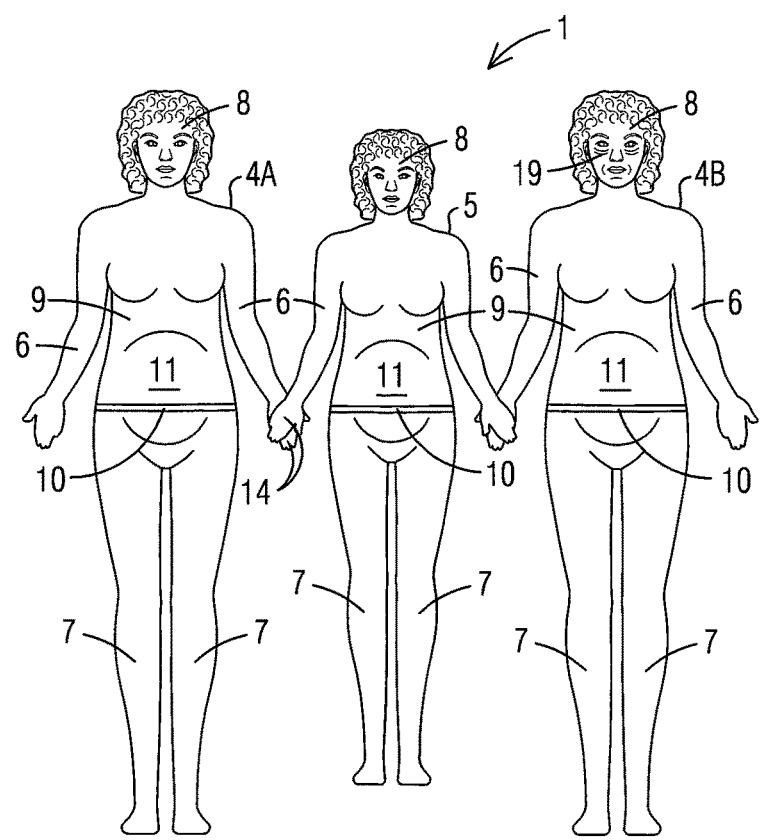
FIG. 2B is a front view of a set of pregnancy education dolls of the present invention with a mature adult female doll with the babies of each doll placed inside the wombs.
Figure 4C:
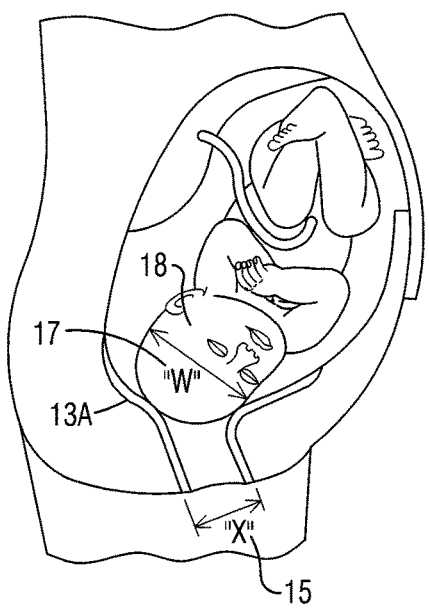
FIG. 4C is a cutaway view of an adult female doll's pelvic outlet and a macrosomic baby doll's head that is too large to pass through the adult female doll's pelvic outlet.

With reference to FIG. 2B, a front view of a set of pregnancy education dolls of the present invention with a mature adult female doll 4B with the babies of each doll placed inside the wombs is illustrated. The adult female doll 4A and the child female doll 5 are holding hands 14 with a mature adult female doll 4B. The mature adult female doll represents older females (age 35 and up) who are at risk for producing larger babies, as illustrated in FIG. 4C, due to factors such as gestational diabetes. The dolls may also comprise visual age characteristics 19, such as facial features, wrinkles, hair color, body size, breast size, clothing style and so forth, to illustrate the difference in ages of the dolls.

With reference to FIG. 3A, a cross-sectional view along line A-A of FIG. 2A of the adult female doll 4A is illustrated. At least one baby doll 2 used in conjunction with the set of pregnancy education dolls 1 and is preferably attached to the set of pregnancy education dolls 1 via a cord 12A that resembles an umbilical cord and placenta 12B. The at least one baby doll 2 may be placed inside the womb 3 of the adult female doll 4A and then pushed through a pelvic outlet 13A, thereby simulating childbirth.

With reference to FIG. 3B, a cross-sectional view along line B-B of FIG. 2A of the child female doll 5 is illustrated. The at least one baby doll 2 may also be placed inside the womb 3 of the child female doll 5, however, the child female doll 5 has pelvic outlet 13B that is smaller than the adult female doll's pelvic outlet 13A (as illustrated in FIGS. 4A and 4B). The at least one baby doll 2 will not fit through the pelvic outlet 13B of the child female doll 5, thereby demonstrating the danger of obstructed labor in pregnancy in undeveloped young females and the cause of obstetric fistulas.

With reference to FIGS. 4A and 4B, cutaway views of an adult female doll's pelvic outlet 13A and a child female doll's pelvic outlet 13B, respectively, are illustrated. The size the child female doll's pelvic outlet 13B is smaller than the adult female doll's pelvic outlet 13A. As illustrated here the width or diameter "X" 15 of the adult female doll's pelvic outlet 13A is greater than the width or diameter "Y" 16 of the child female doll's pelvic outlet 13B. The width or diameter "W" 17 of the at least one baby doll's head 18 is preferably larger than diameter "Y" 16 and less than, equal to or only slightly larger than diameter "X" 15. Therefore, the at least one baby 2 will fit though the adult female doll's pelvic outlet 13A when pushed but will not fit through child female doll's pelvic outlet 13B, thereby demonstrating the danger of pregnancy in undeveloped young females and the cause of obstetric fistulas. These young girls' bodies are not fully developed and, thus, they are too small to pass a baby through the pelvic outlet during labor.

With reference to FIG. 4C, a cutaway view representing an adult female doll's or mature adult female doll's pelvic outlet 13A and a macrosomic baby doll's head 18 that is too large to pass through the adult female doll's pelvic outlet 13A is illustrated. Obstetric fistulas also commonly occur in older women when a baby or babies are too large to pass through a pelvic outlet 13A. As illustrated here, an additional baby doll 2 may be provided with the pregnancy education dolls 1 of the present invention, wherein the baby represents a "macrosomic" baby with a head having a diameter "W" 17 that is larger than the width or diameter "X" 15 of the adult female doll's pelvic outlet 13A.

Figure 4D:
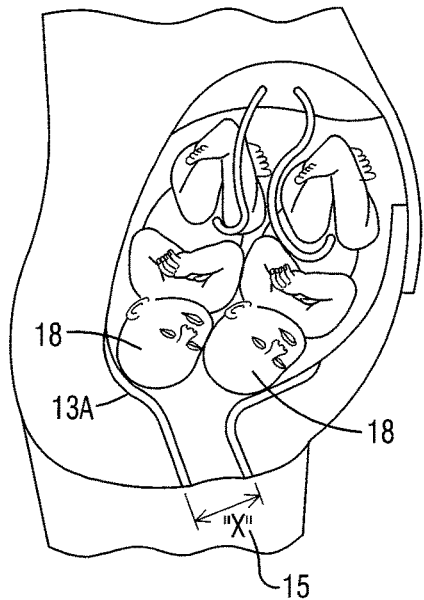
FIG. 4D is a cutaway view of an adult female doll's pelvic outlet and two baby dolls' heads that when combined are too large to pass through the adult female doll's pelvic outlet.

Finally with reference to FIG. 4D, a cutaway view of an adult female doll's pelvic outlet 13A and two baby dolls' heads 18 that when combined are too large to pass through the adult female doll's pelvic outlet 13A is illustrated. Obstetric fistulas also commonly occur in women who are pregnant with multiples, such as twins, triplets and so forth. This is especially the case when the babies are conjoined or entangled baby, thus making it impossible to pass through a pelvic outlet. As illustrated here, two or more baby dolls 2, representing a multiple birth, may be provided with the pregnancy education dolls 1 of the present invention to demonstrate the inability of both babies to pass through the pelvic outlet 13A. The baby dolls 2 may be separate, conjoined or entangled babies.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A set of pregnancy education dolls comprising:
   an adult female doll having arms, legs, a head and torso;
   a child female doll having arms, legs, a head and torso;
   a height of the child female doll is less than a height of the adult female doll;
   said adult female doll having a womb located in its torso that is accessible through an opening in the belly;
   said child female doll having a womb located in its torso that is accessible through an opening in the belly;
   at least one baby doll;
   said adult female doll having a pelvic outlet leading from the womb to outside the torso;
   said child female doll having a pelvic outlet leading from the womb to outside the torso;
   said at least one baby doll having a size that is capable of fitting through the adult female doll's pelvic outlet; and
   said at least one baby doll having a size that renders it incapable of fitting through the child female doll's pelvic outlet.

2. The set of pregnancy education dolls of claim 1 wherein:
   said adult female doll is connected to the child female doll to highlight the comparative nature of the set of pregnancy education dolls.

3. The set of pregnancy education dolls of claim 2 wherein:
   said adult female doll and child female doll are holding hands.

4. The set of pregnancy education dolls of claim 1 wherein:
   a diameter of the adult female doll's pelvic outlet is greater than a diameter of the child female doll's pelvic outlet; and
   a diameter of the at least one baby doll's head larger than the diameter of the child female doll's pelvic outlet.

5. The set of pregnancy education dolls of claim 4 further comprising:
   an additional baby doll having a head with a diameter that is larger than the adult female doll's pelvic outlet.

6. The set of pregnancy education dolls of claim 1 further comprising:
   a mature adult female doll having arms, legs, a head and torso; and said mature adult female doll having at least one visual age characteristic.

7. The set of pregnancy education dolls of claim 6 wherein:
   said adult female doll, child female doll and mature adult female doll are holding hands.

8. A set of pregnancy education dolls comprising:
   an adult female doll having arms, legs, a head and torso;
   a child female doll having arms, legs, a head and torso;
   a height of the child female doll is less than a height of the adult female doll;
   said adult female doll having a womb located in its torso that is accessible through an opening in the belly;
   said child female doll having a womb located in its torso that is accessible through an opening in the belly;
   at least one baby doll attached to the set of pregnancy education dolls via a cord;
   said adult female doll having a pelvic outlet leading from the womb to outside the torso;
   said child female doll having a pelvic outlet leading from the womb to outside the torso;

said at least one baby doll having a size that is capable of fitting through the adult female doll's pelvic outlet;

said at least one baby doll having a size that renders it incapable of fitting through the child female doll's pelvic outlet; and said adult female doll is connected to the child female doll to highlight the comparative nature of the set of pregnancy education dolls.

9. The set of pregnancy education dolls of claim 8 wherein:

said adult female doll and child female doll are holding hands.

10. The set of pregnancy education dolls of claim 8 wherein:

a diameter of the adult female doll's pelvic outlet is greater than a diameter of the child female doll's pelvic outlet; and a diameter of the at least one baby doll's head larger than the diameter of the child female doll's pelvic outlet.

11. The set of pregnancy education dolls of claim 8 further comprising:

an additional baby doll having a head with a diameter that is larger than the adult female doll's pelvic outlet.

12. The set of pregnancy education dolls of claim 8 further comprising:

a mature adult female doll having arms, legs, a head and torso; and said mature adult female doll having at least one visual age characteristic.

13. The set of pregnancy education dolls of claim 12 wherein:

said adult female doll, child female doll and mature adult female doll are holding hands.

* * * * *